United States Patent [19]

Tennant

[11] 4,063,577

[45] Dec. 20, 1977

[54] WOOD LATHE TOOL HOLDER

[76] Inventor: Larrie A. Tennant, 1621 PH 10, Castle Rock, Wash. 98611

[21] Appl. No.: 695,002

[22] Filed: June 11, 1976

[51] Int. Cl.[2] ........................ B27C 7/06; B23B 3/02

[52] U.S. Cl. ........................ 142/49; 82/4 A; 82/24 R

[58] Field of Search ............... 142/48, 49, 56; 82/4 A, 82/6 R, 6 A, 24 R

[56] References Cited

U.S. PATENT DOCUMENTS

| | | | |
|---|---|---|---|
| 684,508 | 10/1901 | Grant | 142/49 |
| 988,630 | 4/1911 | Diederich | 142/49 |
| 1,036,257 | 8/1912 | Kacsmarik | 142/56 |
| 3,038,356 | 6/1962 | Atzberger | 82/4 A |

FOREIGN PATENT DOCUMENTS

| | | | |
|---|---|---|---|
| 544,990 | 6/1956 | Italy | 142/49 |
| 610,176 | 10/1948 | United Kingdom | 82/6 R |

*Primary Examiner*—Leonidas Vlachos

*Attorney, Agent, or Firm*—Eugene D. Farley

[57] ABSTRACT

A tool holder for use on a wood lathe provided with a bed rail and a support block slidably mounted thereon comprises an arm and mounting means mounting one end of the arm on the block in an outwardly extending direction. A sleeve fixed to the other end of the arm transversely thereof rotatably and slidably receives a post. A clamp associated with the sleeve fixes the post in a selected position of sliding and rotational adjustment. An adjustable ram is fixed on the outer end of the post transversely thereof. A knife block attached to the inner end of the ram mounts a knife in operative position with respect to the work.

2 Claims, 5 Drawing Figures

WOOD LATHE TOOL HOLDER

BACKGROUND OF THE INVENTION

This invention pertains to tool holders for lathes. It pertains particularly to tool holders for wood lathes of the class popular for use in home work shops.

Metal lathes almost universally are provided with tool holders used for holding selected knives in selected positions with respect to work being turned on the lathe. This is not the case, however, with most wood lathes, particularly those employed in the home work shop.

In the use of such lathes, the cutting tool normally is held by hand. As a consequence, accurate work is difficult to achieve. Also, where a multiplicity of pieces of like pattern, as bannister spindles or candle holders are being produced, it is virtually impossible to make any two of the pieces exactly alike.

It accordingly is the general object of the present invention to provide a tool holder for use on home workshop wood lathes which permits positioning the cutting tool accurately with respect to the work.

Another object of this invention is the provision of a wood lathe tool holder which is adjustable easily and rapidly in any desired direction - up or down, in or out, angularly, or rotationally.

Another object of this invention is the provision of a wood lathe tool holder which mounts the cutting tool accurately and fixedly with respect to the work in the selected position of adjustment.

Another object of this invention is the provision of a wood lathe tool holder which is readily adaptable for use on home wood lathes of the various conventional classes, without extensive modification or rebuilding of the lathe.

Another object of this invention is the provision of a wood lathe tool holder the use of which makes possible cutting a selected pattern in a multiplicity of work pieces, the pattern so cut in one of the pieces being identical with the patterns cut in the remaining pieces.

Another object of this invention, is the provisiton of a wood lathe tool holder the use of which simplifies the lathe cutting operation so that a high degree of skill is not necessry to obtain a superior product.

Another object of this invention is the provision of a wood lathe tool holder which is simple and rugged in construction, durable, and free from difficult maintenance problems.

Broadly stated, the wood lathe tool holder of my invention which accomplishes the foregoing and other objects of the invention is adapted for use on a wood lathe fitted with a bed rail and a support block slidably mounted thereon. The tool holder comprises an arm, and mounting means adjustably mounting one end of the arm on the support block.

A sleeve is fixed to the other end of the arm transversely thereof. A post is slidably received in the sleeve for longitudinal and rotational movement. A clamp on the sleeve clamps the post in the selected position of longitudinal and rotational adjustment.

An adjustable ram is fixed to the outer end of the post. It in turn mounts a knife block accommodating cutters of various categories.

Accordingly, my tool holder provides multiple adjustments - adjustment of the arm both rotationally and longitudinally; adjustment of the post up and down and rotationally; adjustment of the ram in and out; and adjustment of the knife rotationally or angularly. This makes it possible to mount the knife in any desired position with respect to the work piece. Once so mounted, it may be applied to the turning of a succession of work pieces each with an identical design cut in its surface.

DESCRIPTION OF A PREFERRED EMBODIMENT

The wood lathe tool holder of the present invention is described herein with reference to the drawings in which.

Figures 1, 2, 3, 4, 5:
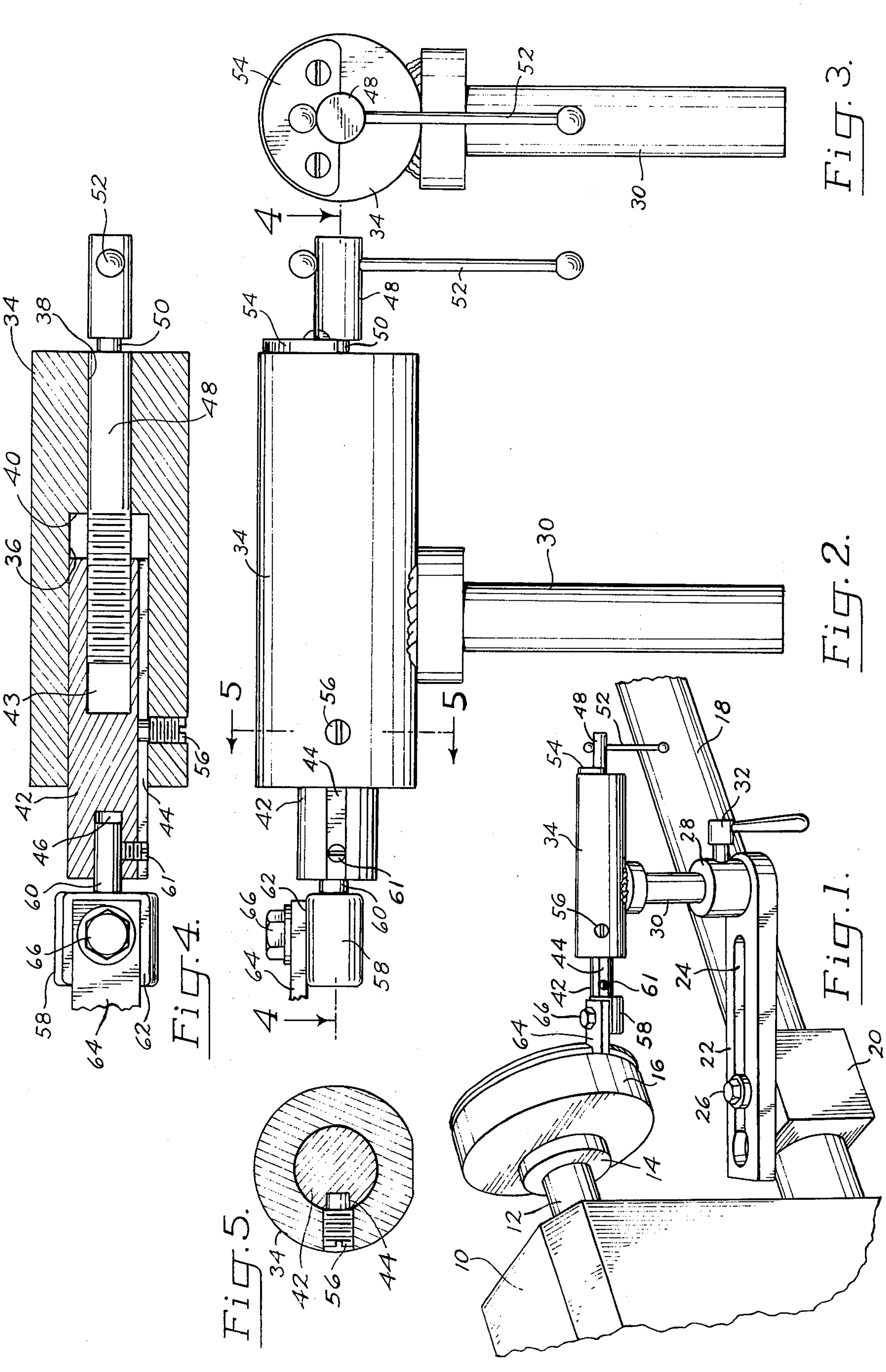
FIG. 1 is a fragmentary perspective of a wood lathe having the hereindescribed tool holder mounted in its operative position with respect to a work piece.
FIG. 2 is a view in side elevation of the tool holder.
FIG. 3 is an end elevation of the tool holder.

FIGS. 4 and 5 are longitudinal and transverse sectional views taken, respectively, along lines 4—4 and 5—5 of FIG. 2.

As shown in FIG. 1, the tool holder of my invention is adapted for use with an otherwise conventional wood lathe including a drive unit 10, a spindle 12 and a chuck 14 mounting a wooden work piece 16. The lathe assembly also includes a bed rail 18 on which slides a support block 20.

The presently described tool holder is mounted on the support block in working relation to work piece 16.

The tool holder comprises an arm 22 which normally is in a horizontal position. The arm is provided with a central longitudinal slot 24. It is mounted adjustably in the selected angular position, as well as in the selected position of extension, by means of a bolt 26 threaded into support block 20.

The outer end of arm 22 mounts a vertical sleeve 28. This is dimensioned to receive a post 30 in sliding and rotational relation. A screw clamp 32 associated with the sleeve bears against the post and releasably secures it in its desired adjustment position.

Ram means is fixed to the upper end of post 30, transversely thereof.

In the illustrated form of the invention the ram means comprises a hollow cylinder 34, FIGS. 2 and 4. The cylinder has a longitudinal stepped bore in two sections. An outer section of enlarged diameter 36 communicates with an inner section 38 of reduced diameter. The two sections are separated by shoulder 40.

A ram 42 works in the enlarged section 36 of the bore. The ram has an inner threaded longitudinal recess 43. On its under side it has a longitudinal keyway 44. At its outer end it has a longitudinally extending central socket 46.

Screw means are provided for adjusting the extension and retraction of ram 42.

The screw means comprises the screw 48 having a threaded inner end which engages the threaded recess 43 of the ram. The screw is of sufficient length to extend rearwardly from cylinder 34. Its outwardly extending shank end has an annular groove 50 and a handle 52. The annular groove receives a keeper 54 which is bolted to the end of the cylinder.

A screw-adjusted key 56 is threaded through the side wall of the cylindrical case and works in key way 44.

The outer end of ram 42 mounts a knife block 58. This member of the assembly has an inwardly projecting pin 60 which is rotatably and slidably received in recess 46 in ram 42. It is adjustably secured by means of set screw 61.

The knife block also has a knife-mounting surface 62. A knife 64 of the selected type is mounted on the knife block by means of a bolt 66.

It thus will be seen that in use the wood lathe tool holder of my invention is universally adjustable in all directions. Arm 22 is adjustable angularly and longitudinally with respect to mounting bolt 26. Post 30 is adjustable up and down and rotatably by operation of screw 32. Ram 42 is adjustable in and out by operation of screw 38.

Operation of set screw 61 makes possible adjustment of knife block 58 rotatably or in an out. Still further, cutting tool 64 may be adjusted angularly as desired by means of bolt 66. Accrodingly, it is easily possible to adjust the working position of the cutting tool to cut a desired pattern in a workpiece of any selected contour or dimensions which is mountable in the lathe.

Having thus described my invention in preferred emboidments, I claim:

1. A tool holder for use on a wood lathe fitted with a bed rail and a support block slidably mounted thereon, the tool holder comprising:
   a. an arm,
   b. mounting means mounting the arm horizontally on the support block for longitudinal and rotational adjustment about a vertical axis, with the arm extending outwardly therefrom,
   c. a sleeve fixed to one end of the arm transversely thereof,
   d. a post slidably received vertically in the sleeve and thereby mounted movably both longitudinally and rotationally,
   e. clamp means on the sleeve for clamping the post therein in a selected position of longitudinal and rotational adjustment,
   f. longitudinally extensible ram means fixed transversely to the outer end of the post and disposed in a horizontal plane parallel to the arm, and
   g. knife mounting means mounted on the outer end of the ram means, and comprising:
      1. a knife block arranged to support a knife, and
      2. pin and socket means on the knife block and outer end of the ram for supporting the knife block for rotational adjustment relative to the ram.

2. A tool holder for use on a wood lathe fitted with a bed rail and a support block slidably mounted thereon, the tool holder comprising:
   a. an arm,
   b. mounting means mounting the arm horizontally on the support block for longitudinal and rotational adjustment about a vertical axis, with the arm extending outwardly therefrom,
   c. a sleeve fixed to one end of the arm transversely thereof,
   d. a post slidably received vertically in the sleeve and thereby mounted movably both longitudinally and rotationally,
   e. clamp means on the sleeve for clamping the post therein in a selected position of longitudinal and rotational adjustment,
   f. longitudinally extensible ram means fixed transversely to the outer end of the post and disposed in a horizontal plane parallel to the arm, the ram means comprising:
      1. an elongated hollow cylinder secured to the post,
      2. an elongated ram mounted slidably in the cylinder for longitudinal reciprocation relative thereto,
      3. an elongated screw threaded to the inner end of the ram and extending therefrom through the end of the cylinder opposite the ram, and
      4. retainer means interengaging the cylinder and screw for confining the screw against longitudinal displacement relative to the cylinder while allowing its rotational movement relative to the cylinder and ram, whereby rotation of the screw causes longitudinal reciprocation of the ram relative to the cylinder and screw, and
   g. knife mounting means mounted on the outer end of the ram means, the knife mounting means comprising:
      1. a knife block arranged to support a knife, and
      2. pin and socket means on the knife block and ram for supporting the knife block for rotational adjustment relative to the ram.

* * * * *